US007764854B2

(12) United States Patent
Fini (10) Patent No.: US 7,764,854 B2
(45) Date of Patent: Jul. 27, 2010

(54) OPTICAL FIBER WITH SPECIALIZED INDEX PROFILE TO COMPENSATE FOR BEND-INDUCED DISTORTIONS

(75) Inventor: John Michael Fini, Jersey City, NJ (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 11/319,121

(22) Filed: Dec. 27, 2005

(65) Prior Publication Data

US 2007/0147751 A1 Jun. 28, 2007

(51) Int. Cl.
*G02B 6/02* (2006.01)
(52) U.S. Cl. .................. 385/123; 385/124
(58) Field of Classification Search .......... 385/123
See application file for complete search history.

(56) References Cited

U.S. PATENT DOCUMENTS

| | | | |
|---|---|---|---|
| 3,989,350 A | 11/1976 | Cohen et al. | |
| 4,106,847 A * | 8/1978 | Arnaud | 385/124 |
| 4,302,231 A | 11/1981 | Macedo et al. | |
| 4,519,826 A | 5/1985 | Tran | |
| 5,018,811 A * | 5/1991 | Haavisto et al. | 385/130 |
| 5,600,738 A * | 2/1997 | Bergland et al. | 385/11 |
| 5,781,684 A * | 7/1998 | Liu | 385/124 |
| 5,963,700 A | 10/1999 | Kato et al. | |
| 6,275,636 B1 * | 8/2001 | Liu et al. | 385/124 |
| 6,301,422 B1 | 10/2001 | Li | |
| 6,321,016 B1 | 11/2001 | Tirboni et al. | |
| 6,351,588 B1 * | 2/2002 | Bhatia et al. | 385/123 |
| 6,363,191 B1 * | 3/2002 | Gillham et al. | 385/48 |
| 6,477,297 B1 | 11/2002 | DeMiritt et al. | |
| 6,614,975 B2 | 9/2003 | Richardson et al. | |
| 6,717,721 B2 | 4/2004 | Kent et al. | |
| 6,728,439 B2 * | 4/2004 | Weisberg et al. | 385/28 |
| 6,771,865 B2 | 8/2004 | Blaszyk et al. | |
| 6,801,699 B1 | 10/2004 | Bickham et al. | |
| 7,171,074 B2 * | 1/2007 | DiGiovanni et al. | 385/28 |
| 2004/0037497 A1 * | 2/2004 | Lee | 385/28 |
| 2004/0052484 A1 | 3/2004 | Broeng et al. | |
| 2004/0101230 A1 | 5/2004 | Philebrown | |
| 2004/0202435 A1 * | 10/2004 | Bickham et al. | 385/123 |
| 2005/0024716 A1 * | 2/2005 | Nilsson et al. | 359/341.31 |
| 2005/0157998 A1 | 7/2005 | Dong et al. | |
| 2005/0226580 A1 * | 10/2005 | Samson et al. | 385/127 |

\* cited by examiner

*Primary Examiner*—Uyen-Chau N Le
*Assistant Examiner*—Kajli Prince (57) ABSTRACT

An optical fiber that exhibits reduced mode distortions as the fiber is bent is formed by properly defining its refractive index profile during fabrication. The as-fabricated profile is defined as a "pre-distorted" profile that takes into account the gradient introduced by bending the fiber. A parabolic index profile is one exemplary bend-resistant profile that exhibits a quadratic form. A raised-cone index is another profile that may be used as the "as-fabricated" profile. In any properly configured form, factors such as bend loss and mode distortion are significantly reduced, since the profile undergoes a shift of essentially constant gradient as a bend is introduced. The resultant effective area of the inventive fiber is substantially improved over state-of-the-art fiber that is subjected to bending during installation. The as-fabricated profile may be incorporated into various types of fibers (birefringent, photonic bandgap, etc.), and is particularly well-suited for use in a fiber amplifier arrangement.

11 Claims, 10 Drawing Sheets

(a) As-fabricated profile (b) Desired equivalent profile equivalent index Bend →

FIG. 7

(a) (b) Bend →

OPTICAL FIBER WITH SPECIALIZED INDEX PROFILE TO COMPENSATE FOR BEND-INDUCED DISTORTIONS

STATEMENT OF GOVERNMENT INTEREST IN INVENTION

This invention was made with the United States Government support under the NIST ATP program, award number 70NANB4H3035, awarded by the National Institute of Standards and Technology (NIST). The United States Government has certain rights in the invention.

TECHNICAL FIELD

The present invention relates to large mode area optical fibers and, more particularly, to a large mode area optical fiber exhibiting a refractive index profile particularly designed to minimize the effects of bend-induced reductions in the fiber's effective area.

BACKGROUND OF THE INVENTION

In the field of optical fiber-based communication, there is an increasing interest in the use of large mode area fibers, particularly associated with the fabrication of fiber-based optical amplifiers and the like, since large mode area fibers are known to overcome various nonlinear impairments, such as Raman and Brillouin scattering. The use of large mode area fibers, however, has been found to increase the presence of other fiber-related sensitivities such as macrobend losses, inter-mode coupling and sensitivities to nonuniformities in the fiber's refractive index profile.

There have been at least two different approaches in the prior art to minimize bend-induced losses in optical fiber. In one approach, essentially a mechanical approach, rod-like fibers are utilized that are extremely bend resistant. By forcing the fibers to remain essentially linear, the bend-induced loss can be significantly reduced. However, in most "field" applications of such fibers, there is a need to bend, even spool, such fibers. Therefore, restricting the physical ability of the fiber to bend is considered to be an impractical solution. The other approach is associated with determining a priori a fixed bend loss by defining the specific "spooling" to be used, and then always utilizing the fiber in accordance with the specified spooling radius (and number of turns). Again, this approach is considered to limit the various applications of large area fibers, as well as limit modifications in the field implementations and variations in the use of such fibers.

While these and other designs take into account the bend-induced losses of the fiber mode, the issue of bend-induced distortion remains neglected—specifically, distortion that includes bend-induced reduced effective area. In previous conventional applications using more conventional core dimensions, such mode distortions had minimal impact. However, in large mode fiber applications, the presence of bend-induced mode distortions generates a significant reduction in effective area.

Thus, a need remains in the art for providing a large mode area fiber whose effective area is not seriously distorted as the fiber is subjected to bending in various applications.

SUMMARY OF THE INVENTION

The need remaining in the prior art is addressed by the present invention, which relates to large mode area optical fibers and, more particularly, to a large mode area optical fiber exhibiting a refractive index profile particularly designed to minimize the effects of bend-induced reductions in the fiber's effective area.

In accordance with the present invention, the refractive index profile characteristics of a large mode area optical fiber are based upon both the conventional bend-induced loss parameters, as well as bend-induced distortions impacting the fiber's effective area. The refractive index profile of a large mode area fiber in accordance with the present invention will essentially compensate for bend-induced distortions that will be "seen" by signals as they propagate along the large mode area fiber.

In a manner similar to signal "pre-distortion", the refractive index profile for a large mode area optical fiber of the present invention is particularly defined in a "pre-bend" fashion such that upon the fiber being bent, the equivalent index profile will have the desired "flat" and "broad" guiding region. It is an aspect of the present invention that the ability to provide the refractive index profile "pre-distortion" may be used with a variety of different types of fibers, including fiber-based amplifiers, photonic bandgap fibers, birefringent fibers, and the like.

In one embodiment of the present invention, a large mode area optical fiber is formed to exhibit an essentially parabolic refractive index profile, where any bending of the fiber functions to merely shift the index profile in a manner such that its parabolic shape is maintained. As a result, the characteristics of the fiber become relatively invariant to bending-related changes.

In an alternative embodiment, a raised-cone refractive index profile has been found to yield a relatively large guiding region with a flat index peak even when the fiber is bent.

Other and further aspects and embodiments of the present invention will become apparent during the course of the following discussion and by reference to the accompanying drawings.

BRIEF DESCRIPTION OF THE DRAWINGS

Referring now to the drawings,

FIG. 7(a) illustrates the profile associated with a "straight" fiber and FIG. 7(b) illustrates the profile associated with a "bent" fiber;

DETAILED DESCRIPTION

Figure 1:
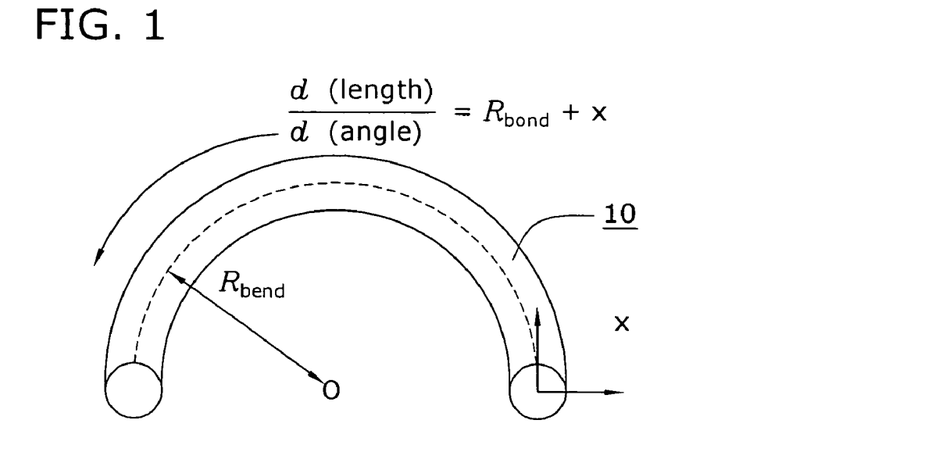
FIG. 1 illustrates an exemplary section of large mode area fiber, including a certain "bend" in the fiber shape.
Figure 2:
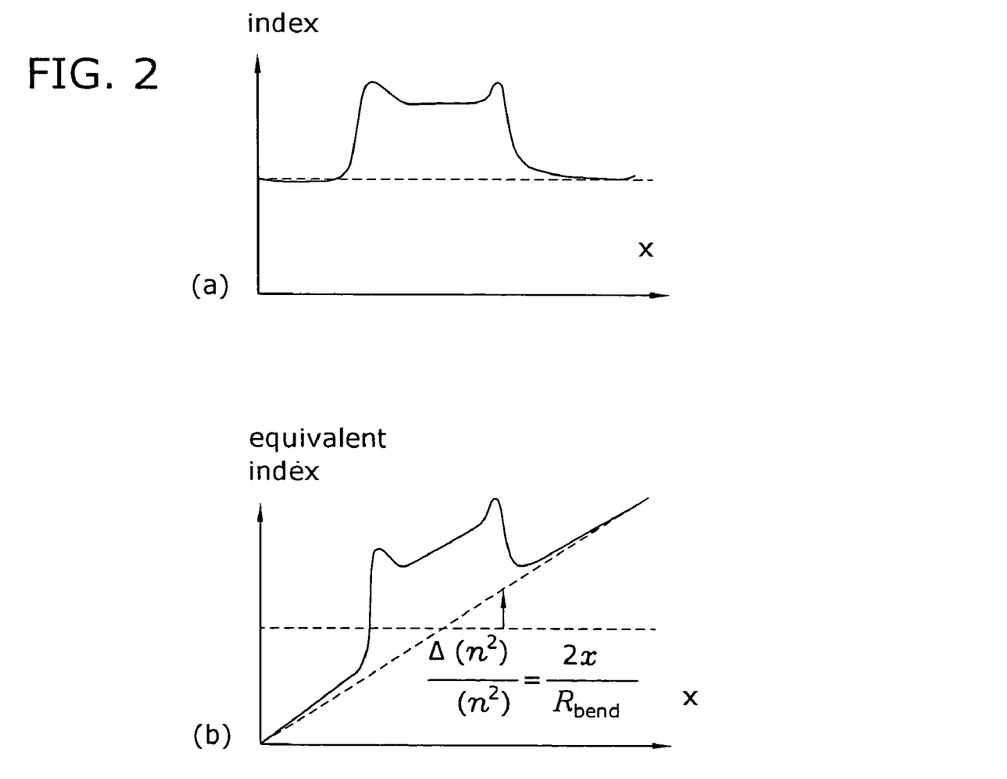
FIG. 2 contains a pair of graphs illustrating the refractive index of the fiber of FIG. 1, FIG. 2(a) illustrating the refractive index of a conventional "straight" fiber, and FIG. 2(b) illustrating the equivalent refractive index of a fiber that is bent as shown in FIG. 1.

FIG. 1 illustrates an exemplary section 10 of a large core diameter optical fiber that has been bent to exhibit a defined bend radius. As shown, bent fiber 10 is defined as having a bend radius $R_{bend}$, with the x-y orientation as shown. The bending of a large core diameter optical fiber, as mentioned above, has been found to introduce distortion in the form of reduced effective area. In particular, the equivalent index model of bent fiber 10 can be determined and then analyzed to account for the different path lengths "seen" by a propagating optical signal at different transverse positions x as it travels around the bend of radius $R_{bend}$ as follows:

$$\frac{d(\text{length})}{d(\text{angle})} = R_{bend} + x,$$

where path lengths are adjusted by defining the equivalent index profile $n_{eq}^2$, $$n_{eq}^2(x, y) = n^2(x, y)\left(1 + \frac{2x}{R_{bend}}\right),$$

which is considered to be a modified version of the nominal refractive index profile ($n^2$) of the optical fiber material. FIG. 2 illustrates the impact of a bend on the refractive index of fiber, with FIG. 2(a) showing the refractive index profile for an essentially "straight" section of fiber, and FIG. 2(b) showing the refractive index profile for a fiber as bent in FIG. 1. As shown, the equivalent refractive index is shifted upward along a slope defined by the following relation:

$$\Delta n = \frac{nx}{R_{bend}}.$$

Figure 3:
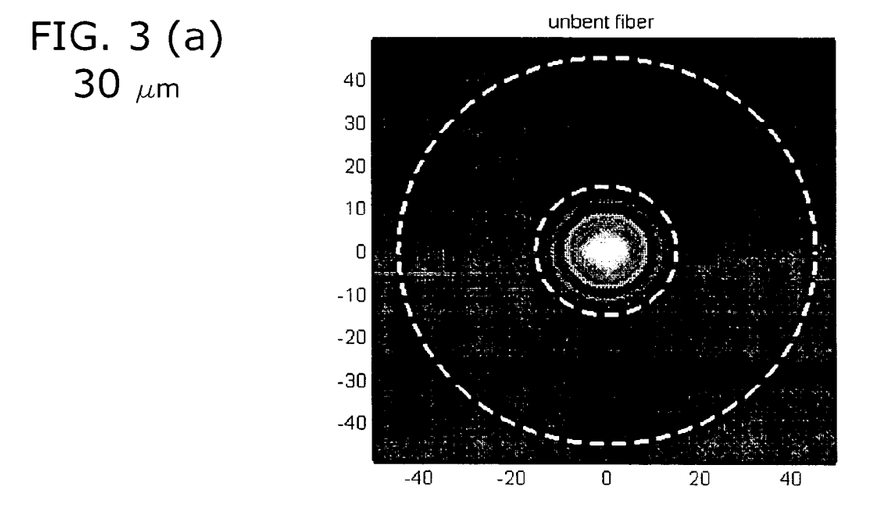
FIG. 3 illustrates the calculated mode fields as a function of fiber core diameter and bend radius.

The calculated mode fields for exemplary fiber and bend dimensions, as shown in FIG. 3, illustrate the impact of bending for prior art fibers, one with a moderately large core area (30 μm)—in the top two images; and one fiber with an extremely large core area (50 μm)—in the bottom two images. In each case, the image on the left illustrates the fundamental mode intensity for a "straight" fiber section, and the image on the right illustrates the fundamental mode intensity for a fiber with a 7.5 cm bend radius. For the purpose of illustration, a large mode area fiber with a step-index core shape was used to create these images. Without the use of the bend compensating refractive index profile of the present invention, it is clear that the mode intensity profile of each fiber is perturbed as a result of the bending, with the perturbation being greater for the larger core area fiber. This perturbation will thus result in distortion of an optical signal propagating through the bent optical fiber. The present invention, by virtue of "pre-compensating" the fiber's index profile, will compensate for this distortion and provide a relatively flat "equivalent profile" for the large mode area fiber.

Figure 4:
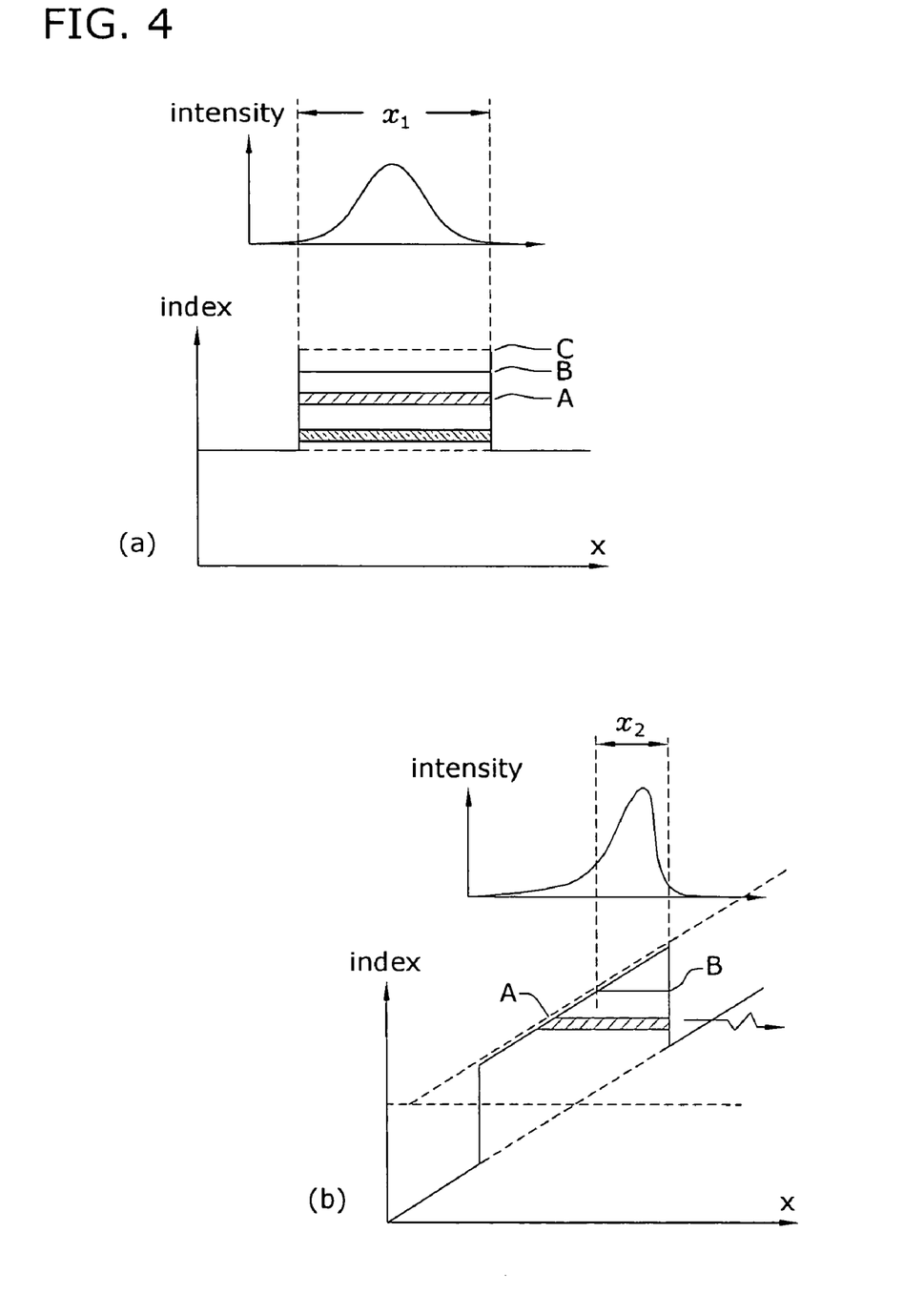
FIG. 4 contains a pair of schematic intensity and index plots, with FIG. 4(a) illustrating the intensity and refractive index profile plots for a "straight" fiber and FIG. 4(b) illustrating the intensity and refractive index profile plots for a "bent" fiber.

The mode distortion in a bent fiber can best be understood by reference to the intensity and index plots of FIG. 4, where FIG. 4(a) illustrates the intensity and refractive index profile plots for a "straight" fiber and FIG. 4(b) illustrates the intensity and refractive index profile plots for a bent fiber. In the bent fiber, it is clearly shown that the mode intensity plot is distorted, having a more asymmetric and sharply-peaked index. Referring to the refractive index plot of FIG. 4(a), the straight fiber is shown as able to support a fundamental mode (with an effective index as indicated by reference letter A), as well as a number of higher order modes (HOMs), illustrated by reference letters B and C in the refractive index profile. These modes are shown as being well-confined over the relatively broad transverse region $x_1$. In contrast, the refractive index plot of FIG. 4(b) illustrates that for the case of a bent fiber (conventional fiber), the fiber is able to support a few modes (modes A and B, in this case), and these fewer modes are confined in a narrower guiding region of core $X_2$. Confinement is now provided by a fairly narrow, low index trench $X_3$. Beyond the trench, on the right-hand side, will be a relatively high index outer cladding region, so that the modes are able to evanescently tunnel out into the cladding, as shown by the arrow in the graph of FIG. 4(b).

Figure 5:
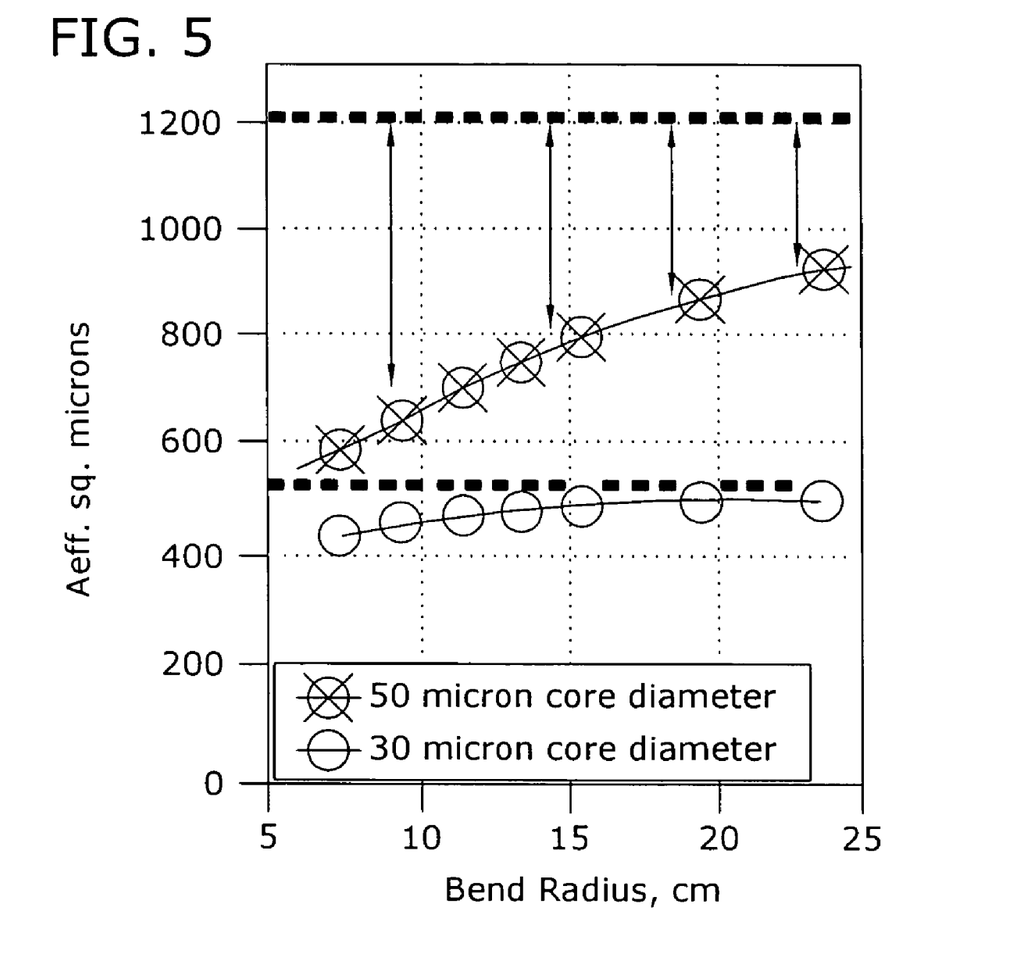
FIG. 5 is a graph of changes in a fiber's effective area as a function of bend radius.

A key parameter affected by bending a large mode area optical fiber is its "effective area". FIG. 5 illustrates the effective area $A_{eff}$ as a function of bend radius $R_{bend}$ for the same two fibers as analyzed above. In particular, the dashed lines represent the effective areas of the "straight" fibers, and the associated curves illustrate the change in effective area resulting from introducing a bend into the fiber. The curves clearly show that the modes of the larger core area (50 μm) fiber have greatly reduced the effective area for any reasonable bend radius (as indicated by the double-ended arrows between the curve and the dashed line.

The equivalent index model defined above leads to the conclusion that the effect of a bend in a fiber (particularly a large area fiber) can be likened to adding a constant index gradient to the profile of the fiber material itself (assuming low contrast). The tighter the bend, the larger the gradient and the resulting bend-induced distortion will be. As mentioned above, however, conventional optical systems and fiber designs do not take this effect into account. Rather, the prior art has concentrated on various methods to limit/control the amount of bend-induced losses. In accordance with the present invention, however, it is proposed to configure a large core area fiber's refractive index profile to account for both bend-induced losses and bend-induced distortion. Indeed, it has been found that the refractive index profile may be configured (referred to hereinafter as the "as-fabricated" profile) so as to increase the effective area "seen" by an optical signal when the fiber is bent.

Figure 6:
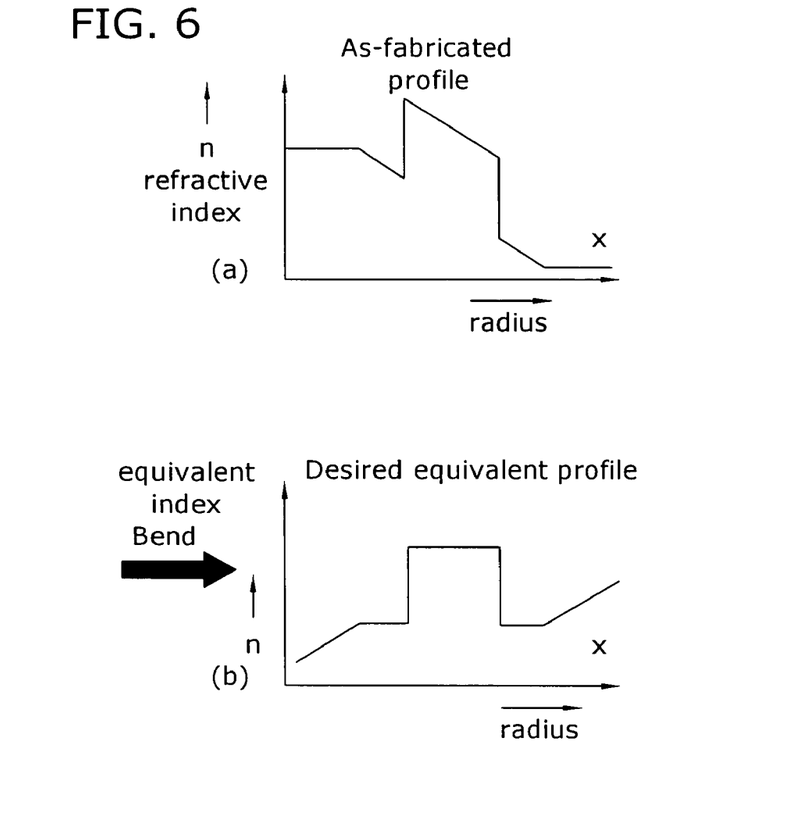
FIG. 6 contains a pair of refractive index profiles, with FIG. 6(a) illustrating an "ideal" as-fabricated profile associated with a fiber that can then be bent to exhibit the "ideal" flat and broad profile as shown in FIG. 6(b)

FIG. 6 illustrates this basic premise of the present invention, where FIG. 6(b) contains a refractive index profile plot (refractive index as a function of distance from the center of the core) as desired for most applications (that is, a relatively large and flat region where an optical signal may propagate with experiencing little or no distortion). FIG. 6(a) shows an "as-fabricated" refractive index profile that is required to provide the resultant "equivalent" index profile of FIG. 6(b), once the fiber is bent. Although the profile as shown in FIG. 6(a) would ideally provide the desired profile, it is relatively difficult to replicate in reasonable fashion in most optical fiber manufacturing processes.

Figure 7:
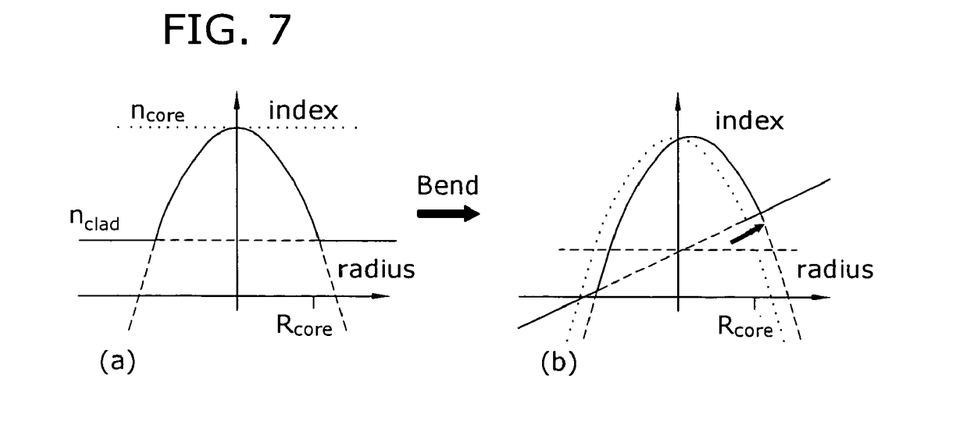
FIG. 7 is a graph of a parabolic-shaped refractive index profile fiber, where

Accordingly, a variety of optical fiber "as-fabricated" profiles are proposed that are manufacturable while also providing the pre-compensated aspects that result in flattening the profile once the fiber is bent. As mentioned above, an advantage of the refractive index treatment of the present invention is that it is applicable to virtually any type of optical fiber (large area fiber). Fiber amplifiers, in particular and as will be addressed in further detail below, are considered as one class of fiber types that are particularly well-suited for the use of such pre-compensation. The inventive technique is equally applicable however, to various other types of fibers including, but not limited to, birefringent fiber, photonic bandgap fibers (including air holes or solid-filled holes extending along the longitudinal axis) and fibers including "features" such as UV-sensitized areas or grating features. One particular embodiment of the present invention utilizes a parabolic refractive index profile as the "as-fabricated" profile, where the parabolic profile will be essentially invariant under the addition of a constant gradient (i.e., as the fiber is bent). A parabolic refractive index profile can be defined as:

$$n(x, y) = n_{core} - (n_{core} - n_{clad})(x^2 + y^2)/R_{core}^2,$$

which thus defines the profile as being invariant under the addition of a constant gradient. It is then automatically pre-compensated for virtually any bend radius, as long as the associated boundary effects remain relatively small. This property is illustrated in FIG. 7, which illustrates in FIG. 7(a) a parabolic-shaped refractive index profile. A truncated version of the profile is illustrated by the darker line in FIG. 7(a), where for the truncated profile $n(x,y) = n_{core}$ for $r > R_{core}$. By mathematically completing the square:

$$n(x, y) + Bx = n_{core} - \frac{\Delta n}{R_{core}^2}(x^2 + y^2) + Bx$$

$$= n_{core} - \frac{\Delta n}{R_{core}^2}[(x - x_d)^2 + y^2] + C,$$

where $\Delta n = n_{core} - n_{clad}$. Thus, the addition of the bend-induced term Bx is equivalent to a displacement $x_d$, where $$x_d = B\frac{R_{core}^2}{2\Delta n},$$

and the addition of a constant index shift, C, is defined by:

$$C = \frac{x_d^2}{R_{core}^2}\Delta n.$$

Such a transformation yields almost no change in mode size or shape as the fiber is bent, as seen by comparing the profile illustrated in FIG. 7(a) to the profile in FIG. 7(b).

Moreover, a truncated parabolic profile fiber will exhibit some additional immunity to bend-induced reduction of effective area, and will then have better resistance to nonlinear impairments. Bend-induced distortion and displacement of the guided light may also have an important change in the overlap between the light and the gain medium. Pre-compensation of the bend-induced distortion can then have the added benefit of improving the gain overlap seen by the amplified signal. As shown, the parabolic index function is naturally invariant (but translated) under the influence of bending, so that mode fields are largely free of bend-induced distortion, asymmetry, and contraction. As a result of this understanding, it has been found in accordance with this embodiment of the present invention that the effective area can be significantly reduced in a "bent" fiber as compared to modes of the same fiber without a bend. This result is extremely important in the context of a fiber amplifier, since most of the fiber is bent (spooled) when deployed in the field. By pre-compensating the refractive index profile in accordance with the present invention, the overlap between the desired (signal) modes of a propagating signal and the gain medium can be improved, while also reducing the overlap between the undesirable ("noise") modes and the gain medium. Indeed, a fiber amplifier of the present invention may be formed in a manner similar to conventional fiber amplifiers, using a rare-earth doped core region (a rare earth element such as, for example, erbium, ytterbium and the like). Indeed, the core dopant may be confined to a portion of the core so as to further improve the overlap between the desired signal mode and the gain region, further improving the amplifier's efficiency. Mode-mixing features may also be provided within the fiber amplifier to provide efficient absorption of the pump light within the gain medium. In some cases, a low index outer cladding layer may be formed around the defined cladding region so as to allow for the pump signal to be guided along the cladding region.

Figure 8:
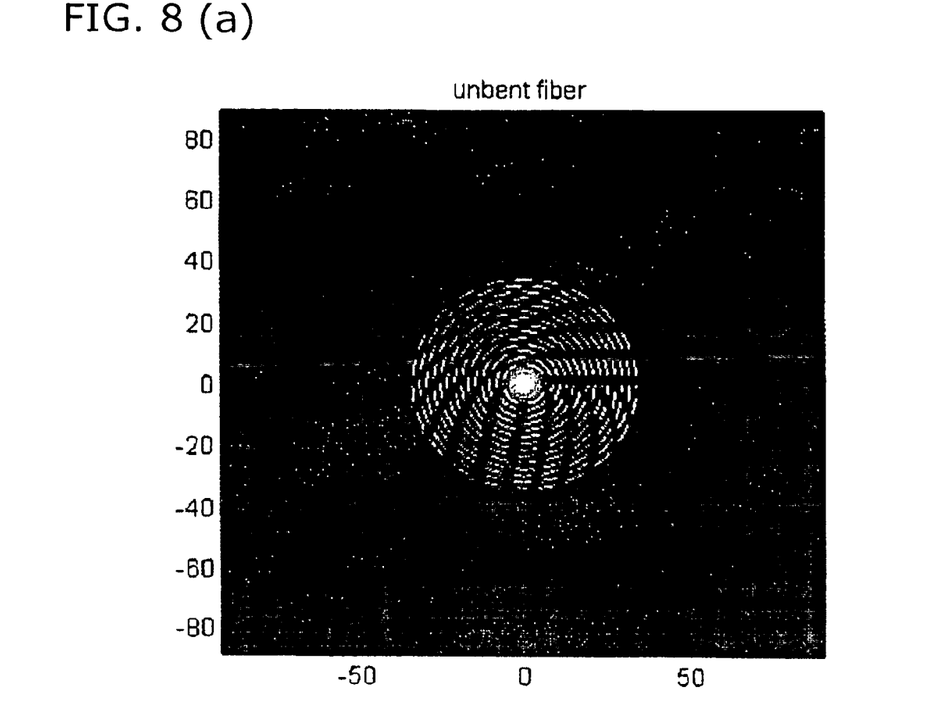
FIG. 8 contains simulation results confirming the stability of the exemplary parabolic profile bend-resistant fiber of the present invention.

FIG. 8 contains simulation results that confirm the stability of the parabolic refractive index profile fiber of this particular embodiment of the present invention. FIG. 8(a) illustrates the mode field profile for a "straight" fiber with a parabolic profile, and FIG. 8(b) illustrates the mode field profile for a fiber having a bend radius of 7.5 cm. Comparing these results to the plots shown in FIG. 3 for conventional index-profiled fibers, it is clear that the use of a parabolic index profile results in much less distortion. Even for a fairly tight bend, the mode shows essentially no distortion or contraction.

Figure 9:
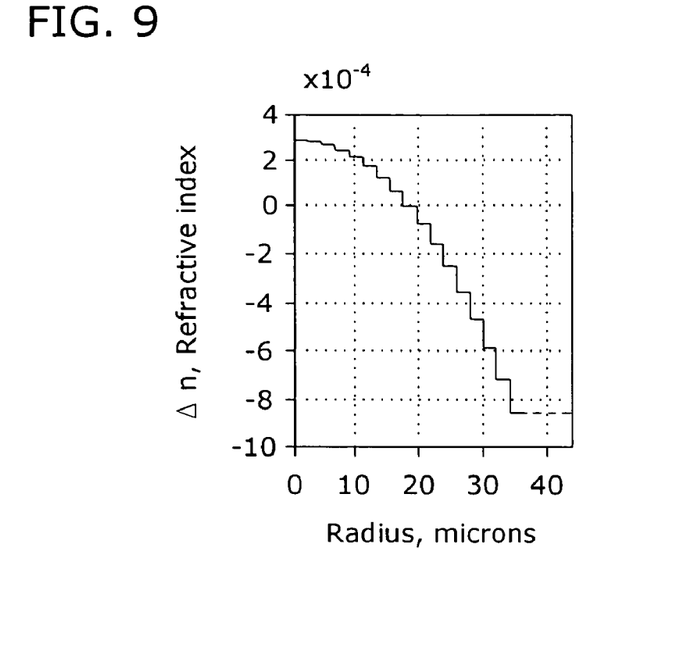
FIG. 9 is a plot of an exemplary piecewise-constant arrangement for the parabolic profile fiber of the present invention.
Figure 10:
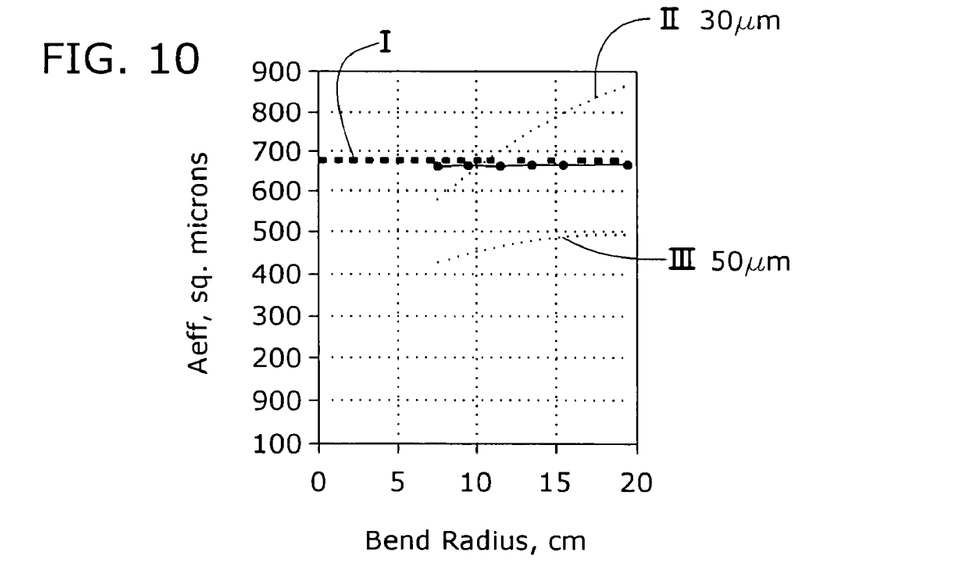
FIG. 10 is a plot of effective area as a function of bend radius for the fiber of FIG. 9.

In a particular configuration of this embodiment of the present invention, the parabolic shape of the refractive index profile may be achieved through piece-wise linear approximation of a number of separate steps, each with a slightly different index. FIG. 9 contains a refractive index profile of such a piecewise-constant index embodiment. The simulated effective area ($A_{eff}$) of this fiber is illustrated as the darker curve in FIG. 10, plotted as a function of bend radius. It is clearly shown that the use of a parabolic index profile results in holding the effective area essentially constant over a bend radius ranging from less than 8 cm to at least 20 cm. For the sake of comparison, the changes in effective area for the 30 μm core prior art fiber (curve II) and 50 μm core prior art fiber (curve III) are also shown in FIG. 10. It is obvious that the prior art fibers are much more affected by bending of the fiber.

Figure 11:
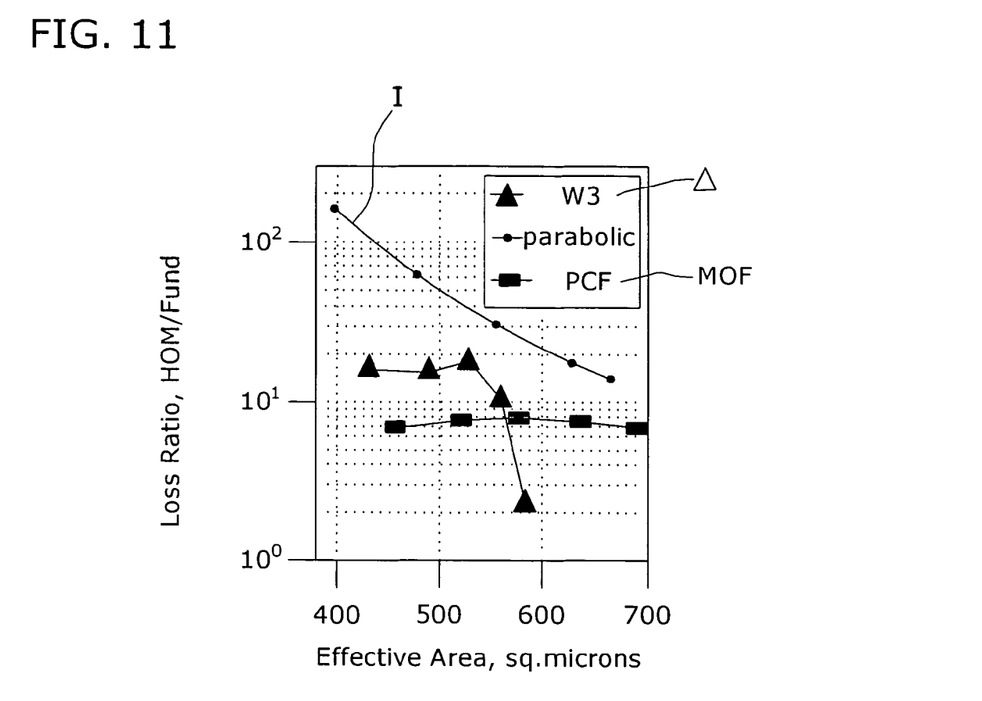
FIG. 11 contains a plot of loss ratio as a function of effective area for the bend-resistant fiber of the present invention.
Figure 12:
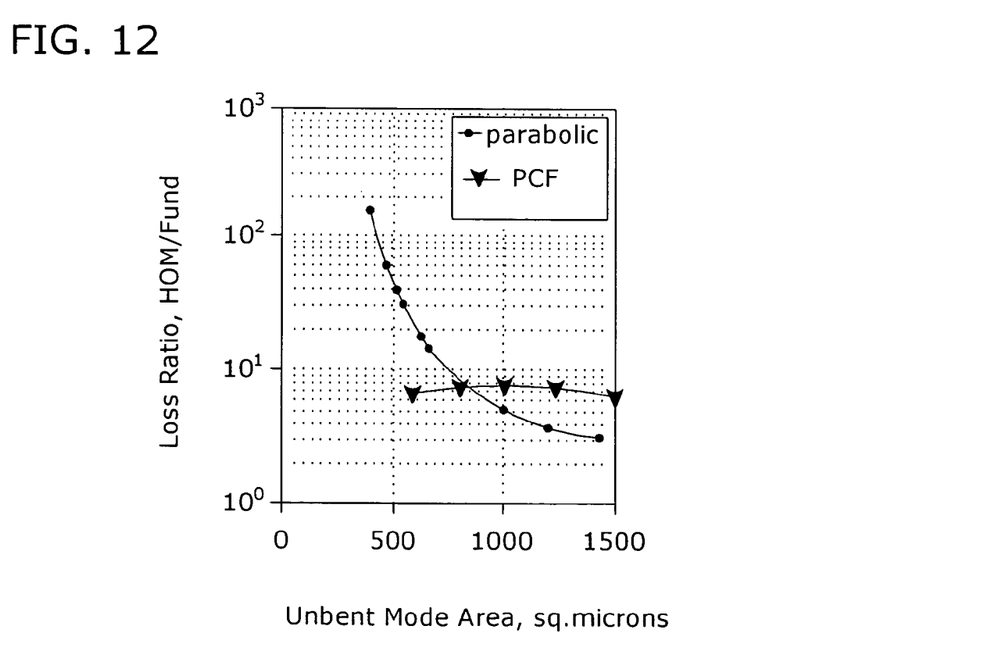
FIG. 12 is a plot, for the sake of comparison, of an incorrect performance comparison that results from neglecting bend-induced changes in effective area.

FIG. 11 contains a plot of loss ratio as a function of effective area for the parabolic profile fiber of this embodiment present invention (curve I), as compared to plots for the standard step-index-core fiber as shown in FIG. 2, and a conventional photonic crystal fiber (formed as a microstructured optical fiber). This plot allows for a comparison of the tradeoff between effective area and higher order modes, where the "best performance" is obtained upwards along the plot (indicating performance as single mode) and to the right (larger mode area). As shown, the parabolic profile fiber of the present invention provides improved performance over prior art fibers according to the measure. For the sake of comparison, FIG. 12 contains the same plot, where bend-induced changes in mode area have been neglected. By ignoring the bend-induced reduction of mode area, it is clear that this plot completely overlooks the potentially important advantages of the parabolic design. This plot further substantiates the need for performing experiments and understanding results based on a "bent" fiber section, particularly in applications where large core area fibers are used.

Figure 13:
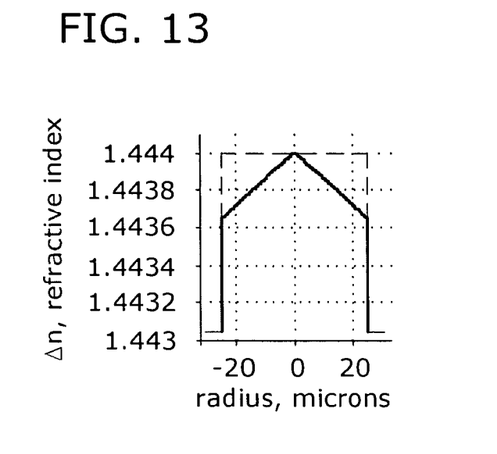
FIG. 13 is a plot of the raised-cone refractive index profile of an alternative embodiment of the present invention.

FIG. 13 contains a refractive index "as fabricated" profile for another embodiment of the present invention, in this case a "raised-cone" index profile, that also results in providing a relatively flat index profile once the fiber is bent. As with the parabolic profile, the raised-cone index profile can be formed as a piecewise approximation with a finite number of constant-index layers. In particular, the index profile for the raised-cone embodiment can be defined as follows:

$$n(x, y) = n_{core} - Ar \text{(for } r < R_{core}\text{); and}$$

$$= n_{clad} \text{(for } r > R_{core}\text{)},$$

where r is defined as the radial distance from the center of the core.

Figure 14:
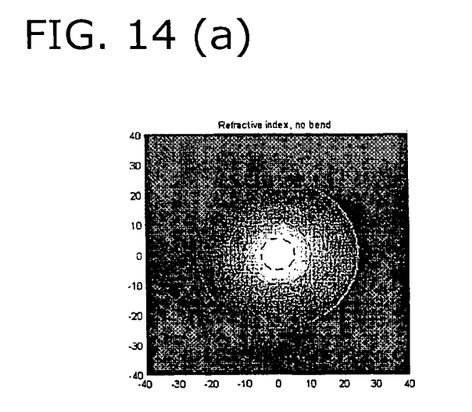
FIG. 14 contains contour plots of the index profile for the "raised-cone" profile for both a straight fiber and a bent fiber.

In this case, if the gradient of the cone matches the bend-induced gradient, the resulting equivalent index profile will have a broad and flat guiding region. FIG. 14 illustrates the contour plots of the index profiles for this fiber, with FIG. 14(a) illustrating the contour plot for a "straight" fiber section and FIG. 14(b) illustrating the contour plot for a "bent" fiber section. Referring to FIG. 14(b), it is clear that this particular raised-cone profile results in providing a large-area guiding region with a flat index peak when the fiber is bent.

Figure 15:
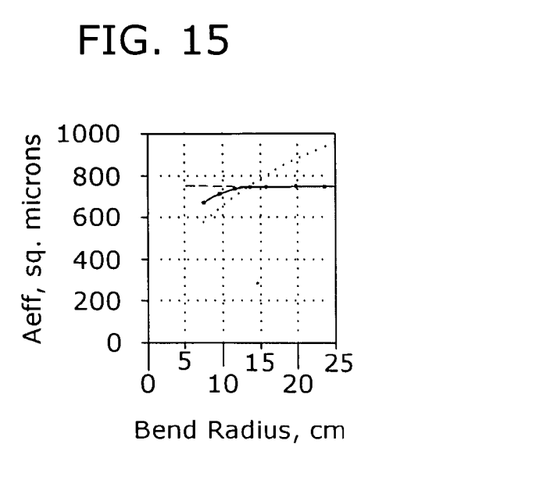
FIG. 15 is a plot of effective area vs. bend radius that compares a conventional step-index core fiber to the raised-cone profile for a bend-invariant fiber of the present invention.

FIG. 15 is a plot of effective area as a function of bending radius, comparing a step-index fiber of the prior art (dotted curve) with a raised-cone bend-invariant fiber formed in accordance with the present invention (solid curve). It is seen that for bends tighter than about 12 cm, the raised-cone profile yields a larger effective area. Thus, by forming a large mode area fiber with a raised-cone profile, the problems with reduced effective area found in the prior art are eliminated.

In summary, the inventive concept is directed defining an "as-fabricated" refractive index profile that essentially compensates for the bend-induced gradient that will be "seen" by guided light within a bent optical fiber. The "as-fabricated" refractive index profile can, in general terms, be defined as a "conventional" profile, with the bend-induced gradient subtracted from the conventional profile.

It will be apparent to those skilled in the art that various modifications and variations can be made to the present invention without departing from the spirit and scope of the invention. In particular, various other refractive index profile arrangements can be used to "pre-distort" the index profile to take the gradient associated with fiber bending into account. Thus it is intended that the present invention cover the modifications and variations of this invention, provided they come within the scope of claims appended hereto, and their equivalents.

What is claimed is:

1. An optical fiber resistant to the influences of bend-induced mode distortion, the optical fiber comprising:
   a core region for guiding a fundamental mode of a propagating optical signal, the fundamental mode exhibiting a large mode area, said core region having a broad and flat refractive index profile reduced by an expected bend-induced index gradient in the region where the fundamental mode is guided, wherein said reduction comprises an as-fabricated index gradient $-n/R_{bend}$ that cancels the expected bend-induced index gradient $n/R_{bend}$, where $R_{bend}$ is a radius to which the fiber is bent and where n is a core refractive index, wherein the refractive index profile mitigates the impact of bending on a fundamental mode intensity profile; and
   a cladding region surrounding the core region.

2. An optical fiber as defined in claim 1 wherein the core region includes a gain medium and the refractive index profile is configured to enhance overlap between the fundamental mode of the propagating optical signal and the gain medium.

3. An optical fiber as defined in claim 2 wherein the gain medium is disposed in a central portion of the core region to reduce overlap between higher order modes of the propagating optical signal and the gain medium.

4. An optical fiber as defined in claim 1 wherein the fiber further comprises a low refractive index outer cladding layer disposed to surround the cladding region, allowing for a pump signal to be guided along the cladding region.

5. An optical fiber as defined in claim 1 wherein the fiber comprises a birefringent fiber formed to preserve polarization of the propagating optical signal.

6. An optical fiber as defined in claim 1 wherein the fiber comprises a microstructure bandgap fiber.

7. An optical fiber as defined in claim 1 wherein the fiber includes UV-sensitive materials to alter the refractive index profile of the core region.

8. An optical fiber as defined in claim 1 wherein the core region refractive index profile is an asymmetric profile with an index gradient aligned with an expected orientation of a fiber bend.

9. An optical fiber as defined in claim 1 wherein the refractive index profile of the core region is defined as:

$$n(x,y) = ncore - (ncore - nclad)(x2+y2)/Rcore2, \text{ for } r < Rcore$$

where ncore is defined as the refractive index at a center of the core region, nclad is defined as a refractive index of the surrounding cladding region, x and y define displacement in an x-y plane of the bending fiber, r is defined as a radial distance from the center of the core region, and Rcore is defined as a radius of the core region.

10. An optical fiber as defined in claim 1 wherein the refractive index profile of the core region is defined as:

$$n(x,y) = ncore - Ar, \text{ for } r < Rcore,$$

where ncore is defined as the refractive index at a center of the core region, r is defined as a radial distance from the center of the core region, A is the anticipated bend-induced gradient, and Rcore is defined as a radius of the core region.

11. An optical fiber resistant to the influences of bend-induced mode distortion beading, the optical fiber comprising an asymmetric refractive index profile approximating a step-index profile reduced by an expected bend-induced index gradient, wherein said reduction comprises an as-fabricated index gradient $-n/R_{bend}$ that cancels the expected bend-induced index gradient $n/R_{bend}$, where $R_{bend}$ is a radius to which the fiber is bent and where n is a core refractive index, wherein the asymmetric refractive index profile mitigates the impact of bending on a fundamental mode intensity profile.

* * * * *